United States Patent
Tsukagoshi et al.

(10) Patent No.: US 7,369,612 B2
(45) Date of Patent: May 6, 2008

(54) VIDEO DECODER AND METHOD FOR USING THE SAME

(75) Inventors: Ikuo Tsukagoshi, Setagaya-ku (JP); Jason N. Wang, San Jose, CA (US); Masahito Yamane, Kanagawa (JP)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 617 days.

(21) Appl. No.: 10/021,228

(22) Filed: Dec. 11, 2001

(65) Prior Publication Data
US 2002/0106025 A1 Aug. 8, 2002

Related U.S. Application Data

(60) Provisional application No. 60/254,823, filed on Dec. 11, 2000.

(51) Int. Cl.
*H04N 7/12* (2006.01)
*G06K 9/36* (2006.01)

(52) U.S. Cl. .......................... 375/240.15; 375/240.25; 382/236

(58) Field of Classification Search ........... 375/240.15, 375/240.25, 240.12, 240.29; 348/173, 556; 382/236
See application file for complete search history.

(56) References Cited

U.S. PATENT DOCUMENTS

| 4,622,577 A | * | 11/1986 | Reitmeier et al. .......... 348/556 |
| 5,614,952 A | * | 3/1997 | Boyce et al. .......... 375/240.01 |
| 6,370,192 B1 | * | 4/2002 | Pearlstein et al. .......... 375/240 |
| 6,385,248 B1 | * | 5/2002 | Pearlstein et al. ..... 375/240.25 |
| 6,462,744 B1 | * | 10/2002 | Mochida et al. ............ 345/543 |
| 7,158,681 B2 | * | 1/2007 | Persiantsev ................. 382/236 |

OTHER PUBLICATIONS

Koprinska. Video Segmentation of MPEG Compressed Data. IEEE. pp. 243-246. 1998.*

* cited by examiner

*Primary Examiner*—Gims Philippe
(74) *Attorney, Agent, or Firm*—Blakely, Sokoloff, Taylor & Zafman LLP

(57) ABSTRACT

A video decoder and a method for using the same are provided. Selected frames of a video stream are trimmed during the decoding of the video stream. The video stream is received. The video stream includes, I, P, and B frames. Only predetermined portions of each B frame of the video stream are decoded.

34 Claims, 13 Drawing Sheets

VIDEO DECODER AND METHOD FOR USING THE SAME

This application claims the benefit of the filing date of the following Provisional U.S. Patent Application: "VIDEO DECODING APPARATUS WITH PICTURE SIZE CONVERSION", application No. 60/254,823, filed Dec. 11, 2000.

FIELD OF THE INVENTION

The present invention relates generally to video streams and, more particularly, to trimming during decoding of video streams.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright©2001, Sony Electronics, Inc., All Rights Reserved.

BACKGROUND

Generally, a video stream must first be decoded and converted to be capable of being displayed on an entertainment device, such as a television. For example, an MPEG transport or program stream usually moves through a system including several components before being in the correct format to be viewed on a display.

The type of system used in decoding and converting the video streams for display may include a demultiplexer and a decoder. The demultiplexer extracts the information in the transport layer or program layer. The demultiplexer then outputs elementary streams to a video decoder, an audio decoder, or both.

The video decoder receives the video elementary stream, decodes it, and outputs the decoded video signal. For an MPEG stream, the decoded video signal is usually in a form of CCIR656 standard. The decoded video signal is then received by a digital-to-analog converter to be converted to an analog RGB signal which may be displayed on a display type device. Other components that may come into play include formatters such as a 656 formatter, and additional memory.

For many display devices, portions of the picture are trimmed for display after the decoding process so that the pictures may fit correctly onto the display device screen. One example may include cutting a portion of the left end of the picture and cutting a portion of the right end of the picture for the end display. However, generally decoding of an entire picture is done before this type of trimming and scaling to display occurs. Since the entire picture is decoded, the decoded data is saved to one or more components. What is needed is a video decoder to trim the picture during the decoding process itself thereby saving both memory space and processor efficiency.

SUMMARY OF THE INVENTION

A video decoder and a method for using the same are provided. Selected frames of a video stream are trimmed during the decoding of the video stream. The video stream is received. The video stream includes, I, P, and B frames. Only predetermined portions of each B frame of the video stream are decoded.

BRIEF DESCRIPTION OF THE DRAWINGS

The present invention is illustrated by way of example, and not limitation, in the figures of the accompanying drawings in which.

DETAILED DESCRIPTION

A video decoder and a method for using the same are disclosed. Reference will now be made in detail to the embodiments of the invention, examples of which are illustrated in the accompanying drawings. While the invention will be described in conjunction with numerous embodiments, it will be understood that they are not intended to limit the invention to these embodiments. On the contrary, the invention is intended to cover alternatives, modifications and equivalents, which may be included within the spirit and scope of the invention as defined by the claims.

Figure 1:
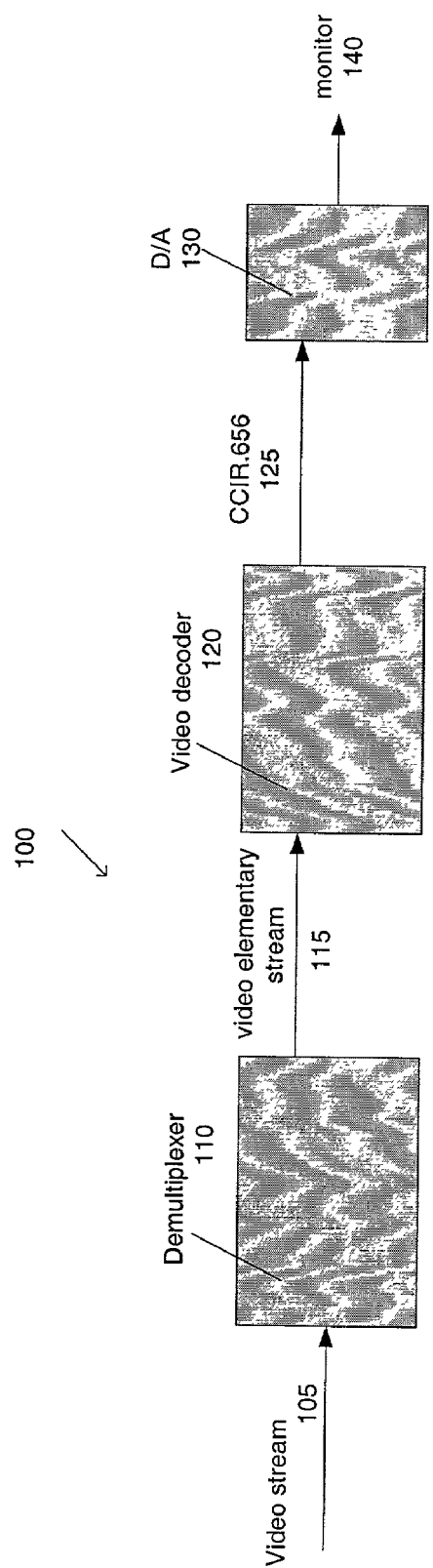
FIG. 1 shows a block diagram of one embodiment of a system for decoding and converting a video stream for display.

FIG. 1 shows a block diagram of one embodiment of a system for decoding and converting a video stream for display. Video stream 105 is input into a demultiplexer 110. The demultiplexer 110 extracts out information in a transport or program layer of the video stream 105. The information extracted out by the demultiplexer includes payload type along with system timing information. System timing information includes PCR, DTS, and PTS. The demultiplexer 110 parses the payload data and provides a video elementary stream 115 output to a video decoder 120. The video decoder 120 receives the video elementary stream 115, decodes it, and outputs a decoded video signal 125. The decoded video signal is in a form of CCIR656 standard. This video signal 125 is received by a digital to analog converter 130. The digital to analog converter 130 converts the video signal 125 to an analog RGB signal or composite analog video through composite encoder. This analog RGB signal goes to a monitor 140 to be displayed.

In one embodiment, an audio signal may go to an audio converter. The audio converter would then take audio elementary stream and decode it. The output from the audio converter would be a decoded audio signal in a form of PCM audio. The audio signal would then be received by a digital to analog converter 130 to be an analog audio signal played on an audio device.

Figure 2:
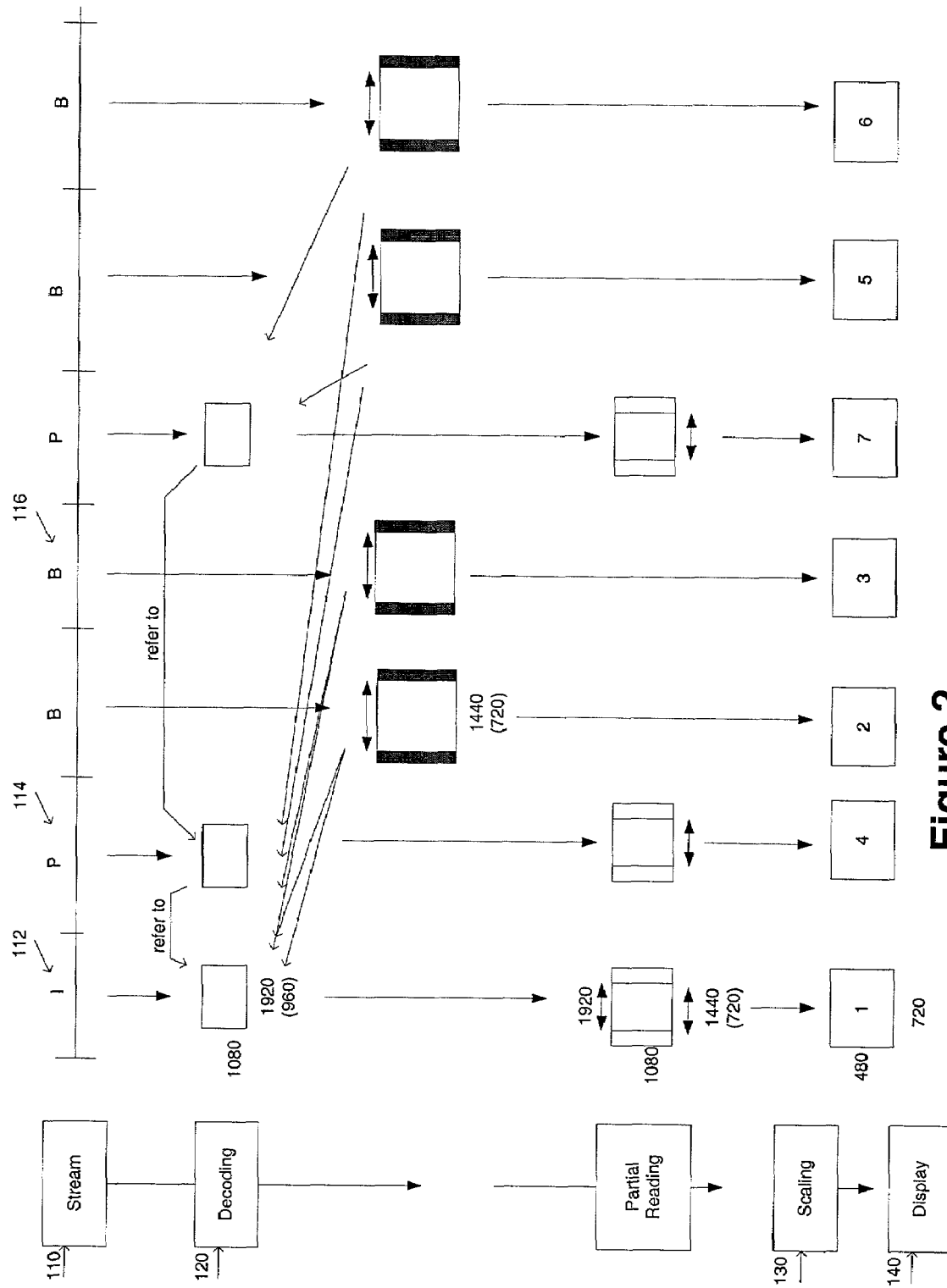
FIG. 2 shows a flow chart illustrating decoding by frame type.

FIG. 2 shows a flow chart illustrating decoding by frame type. In FIG. 2, a stream layer 110 is shown. The stream layer 110 for a video elementary stream includes I, P, B pictures. An I picture 112 is an intraframe or field which includes complete image data in compressed form. A P picture 114 is an interframe or field which has differential information to the previous I or P picture. A B picture 116 is also an interframe or field which has bi-directional predictive differential information to the previous and successive I and P pictures. Because I and P pictures 112 and 114 are referred as anchor frames to B pictures 116, I and P pictures 112 and 114 are encoded before the associated B picture 116 in the stream 110 as shown in FIG. 2.

Accordingly, this stream structure allows the decoder to trim the picture only on B pictures 116 and not on I or P pictures 112 and 114. Because I and P pictures 112 and 114 are referred by successive P and B pictures 114 and 116, no correct decoding is guaranteed if a decoder trims the I and P pictures 112 and 114. Accordingly, only B pictures 116 can be decoded partially as shown in FIG. 2 at the decoding layer 120.

As shown in FIG. 2, decoding of a B picture 116 is done partially, and the partially decoded frame data is stored in frame memory. Normal decoding of I and P pictures 112 and 114 is also, done, executed and stored in memory. Then, all the I, P, and B pictures 112, 114, and 116 proceed to scaling 130 and are put on a display 140.

In one example, using a scaling of 1920×1080, the stream has compressed data for 1,080i full resolution. The video decoder decodes each complete frame for I and P pictures 112 and 114 and stores each frame whose size is 1920×1080. For B pictures 116, the video decoder decodes only 1440 pixels in horizontal and 1080 lines in vertical.

In the next step, only 1440 pixels in horizontal are read for scaling in I and P pictures 112 and 114, while all the data in B pictures 116 are read for scaling. This allows for the same picture quality among I, P, and B pictures 112, 114 and 116, since the same filters apply to the same scaling ratio. The ordering of display is dependent on the I, P, B, 112, 114, and 116 picture coding type configuration. Picture ordering in stream is different from picture ordering for display. As shown in FIG. 2, the display ordering as specified as number in scaling output assuming scaling is executed on the fly to display.

Figure 3:
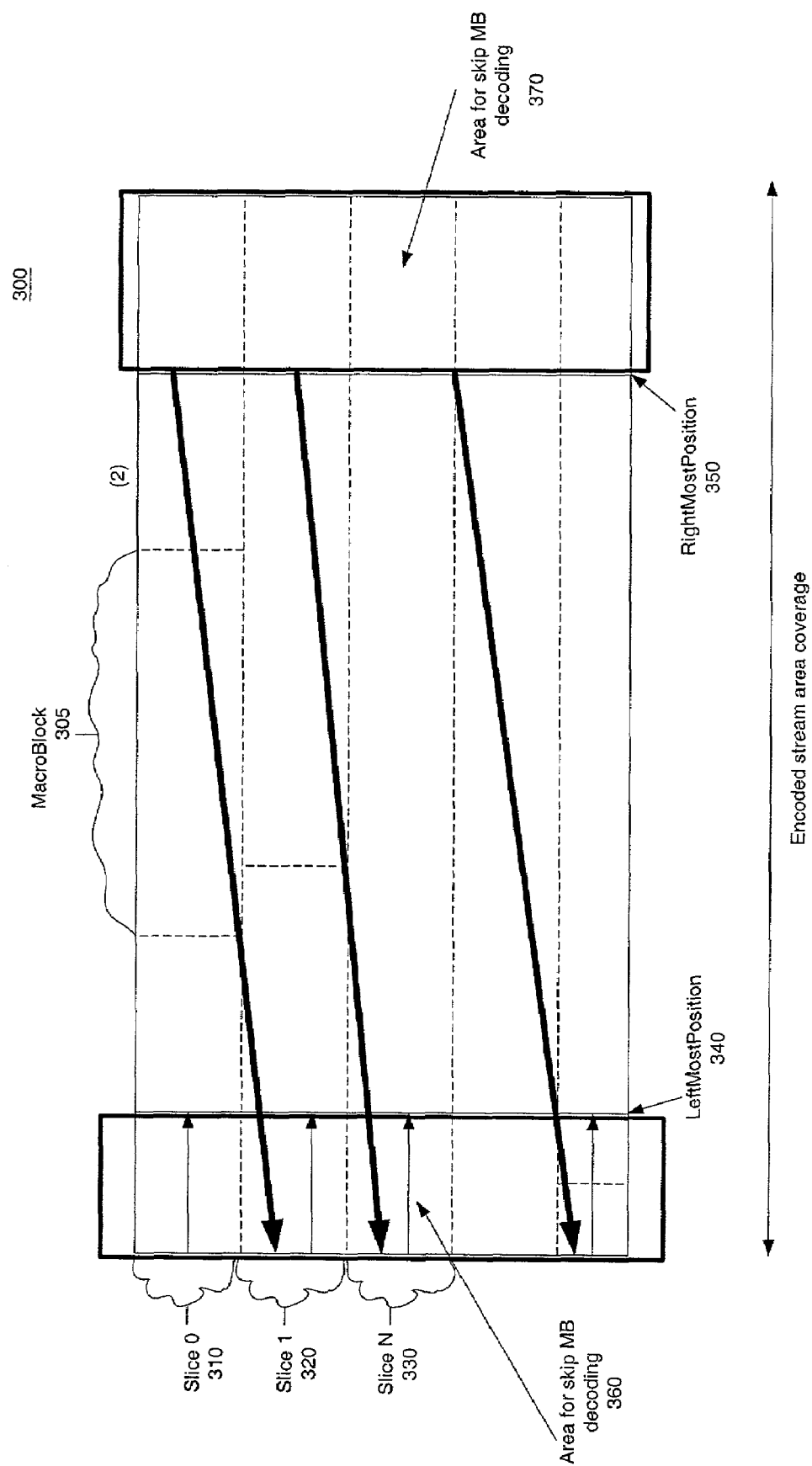
FIG. 3 shows a sliced layer view of trimming during decoding of a B frame.

FIG. 3 shows a sliced layer view of trimming during decoding of a B frame or picture. In a video elementary stream, picture data with decoding instruction parameter is embedded at a picture layer. Picture layer includes multiple sliced layer data which is shown in FIG. 3. Sliced layer includes at least one natural block (MB) data 305 as shown in FIG. 3. Each slice layer 330 starts with a slice_start_code which is a unique word in the stream. The slice_start_code value specifies a vertical position in a frame. For example, if there are N number of slices 330 horizontally at the same vertical position, the slice_start_code values in the slices 330 are the same.

To achieve such trimming in the decoder, the decoder is instructed first to get a left most position 340 and right most position 350 of trimming by system controller. Those positioning parameter are in pixel accurate. In one embodiment, the positions 340 and 350 can be decided automatically by calculating in the above mentioned way and trimming from a center offset.

When a Pan&Scan vector is specified either in the stream or from a system controller, the trimming position can follow the vector position. Starting from the first slice header (Slice 0) 310 in each vertical slice 330, the decoder skips stream by counting the number of macro blocks 305 until the position meets or exceeds the left most position 340 of trimming. Here, the skipping to the left most position 340 means that the decoder only decodes MB header, but it does not decode DCT coefficients . When it comes to the left most position 340, decoder activates the decoding process until the position comes to or exceeds the right most position 350 of the trimming by counting the decoded macro blocks 305. When it comes to the right most position 350, decoder skips stream until it finds the next vertical slice header which has an incremental vertical value, in this case, slice 1320. The partial decoding continues to occur until the entire picture has been trimmed. In the case shown in FIG. 3, there are two areas for skip MB decoding 360 and 370. In alternative embodiments, the trimming may also be done by trimming horizontally rather than vertically so that the area for skip MB decoding may be at the top and bottom of a picture rather than on the sides which is shown in FIG. 3.

Figure 4:
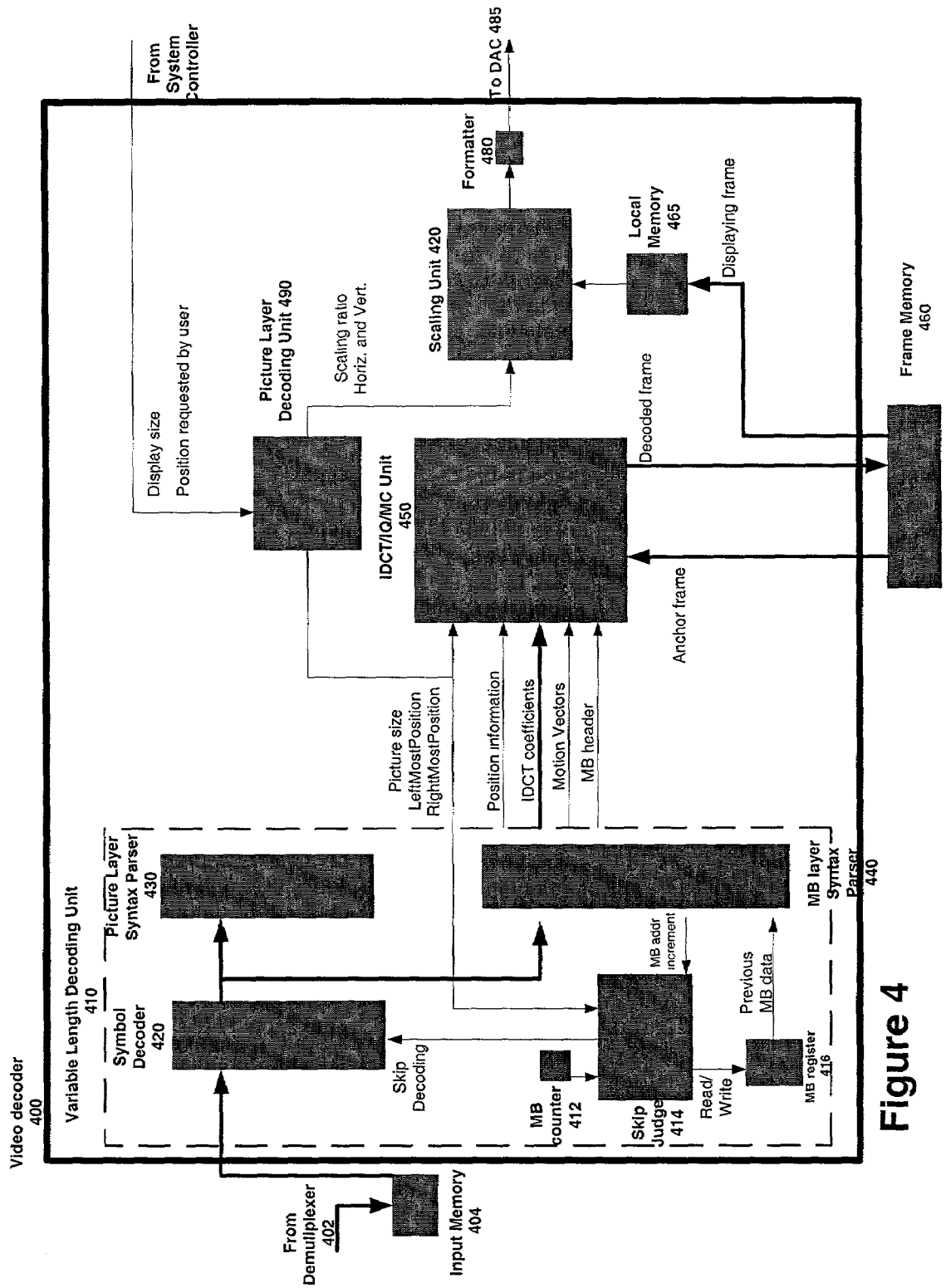
FIG. 4 shows a block diagram of one embodiment of a video decoder showing control flow.

FIG. 4 shows a block diagram of one embodiment of a video decoder 400 indicating control flow. In one embodiment, within the video decoder 400, there are several components including a variable length decoder unit 410, a picture layer decoding unit 490, a reconstruction unit, a scaling unit 420, and a formatter 480. In one embodiment, the reconstruction unit may be an inverse discrete cosine transform/inverse quantizer/motion compensation (IDCT/IQ/MC) unit 450 as shown in FIG. 4.

Video decoder 400 receives an elementary stream from a demultiplexer 402 through an input memory 404. The input memory buffer occupancy is managed not to overflow nor underflow by the MPEG2 video encoder to satisfy the Video Buffering Verifier (VBV) control. Symbols in the stream are first decoded at the symbol decoder 420 in variable length decoding unit 410. At the symbol decoder 420, there is a symbol decoding table to decompose a variable length coded symbol and pass it to both a picture layer syntax parser 430 and a MB layer syntax parser 440.

At the picture layer syntax parser 430, any information higher than the macro block (MB) layer is examined in the semantics check and information such as picture_coding_type, picture horizontal and vertical size, and Pan&Scan Vector (which are necessary for constructing a picture) is passed to picture layer decoding unit 490. At the MB layer syntax parser 440, any information at the MB layer or below is checked for semantics, and information such as IDCT coefficients, motion vector and all other MB header information is sent to the IDCT/IQ/MC unit 450. The MB layer syntax parser also supplies the current MB position information to IDCT/IQ/MC unit.

When the MB layer syntax parser 440 finds information of MB address increment, it passes the information to skip judge 414. In one embodiment, the skip judge 414 resets an MB counter 412 at the beginning of each vertical slice to start counting the number of MBs horizontally.

When the left most position and right most position from picture layer decoding unit 490 are not the same value as picture size, skip judge 414 determines when to skip decoding by referring to the MB counter value. Until the MB counter value (translated to MB counter value ×16) exceeds the left most position, skip judge 414 gives an instruction to skip decoding (skip_decoding) to the symbol decoder 420. When the MB counter value exceeds the left most position, skip judge 414 instructs the symbol decoder 420 to stop skipping and start decoding. While the decoding is executed, the IDCT/IQ/MC unit 450 does an inverse DCT (IDCT) and adds the output of IDCT with data in a spatially shifted location in an anchor frame as instructed by the motion vectors. Then the IDCT/IQ/MC unit 450 stores the decoded frame to frame memory 460. Decoding in the IDCT/IQ/MC unit 450 proceeds by referring to the left most position and right most position provided by the picture layer decoder unit 490.

When the MB counter value exceeds right most position, skip judge 414 gives an instruction to stop decoding of current vertical slice and skip decoding till the next vertical slice header code is found. In one embodiment, there is multiplexed information of MB address increment in the stream, and that condition is also taken into account by the skip judge 414. This information is to be replaced with the previous MB data in an MB register 416, and the MB counter 412 proceeds its counting one by one. The MB register 416 is updated once per MB period if the corresponding stream is not the MB address increment.

As seen in FIG. 4, the picture layer decoding unit 490 receives certain information from a system controller such as display size, and frame offset position information which is similar to the Pan&Scan Vector as a user requested display. Accordingly, where the picture_coding_type is B, the picture layer decoding unit 490 generates an instruction to the skip judge 414 in variable length decoding unit 410 to eliminate a portion of the picture by skipping decoding with left most position and right most position information together with picture size information. The picture layer decoding unit 490 also provides information including a scaling ratio in both vertical and horizontal to the scaling unit 420.

The scaling unit 420 includes a vertical linear filter and a horizontal linear filter. Associated data to be scaled is always stored in a local memory 465 from the frame memory 460. An advantage of the local memory 465 is to increase frame memory 460 bandwidth efficiency by temporally storing the data in the local memory 465, especially in the vertical filtering. The scaling unit 420 receives the scaling ratio in horizontal and vertical from the picture layer decoding unit 490. After the scaling unit 420 sets up an appropriate filter coefficient set in its filtering logic, the scaling unit 420 does the vertical and horizontal filtering to generate a target frame size.

As seen in FIG. 4, output of the scaling unit then goes to a formatter 480. In one embodiment, the formatter 480 is a 656 formatter. At the formatter 480, raw digital data is configured in a 656 format and transmitted to a Digital-to-Analog converter 485.

Figure 5:
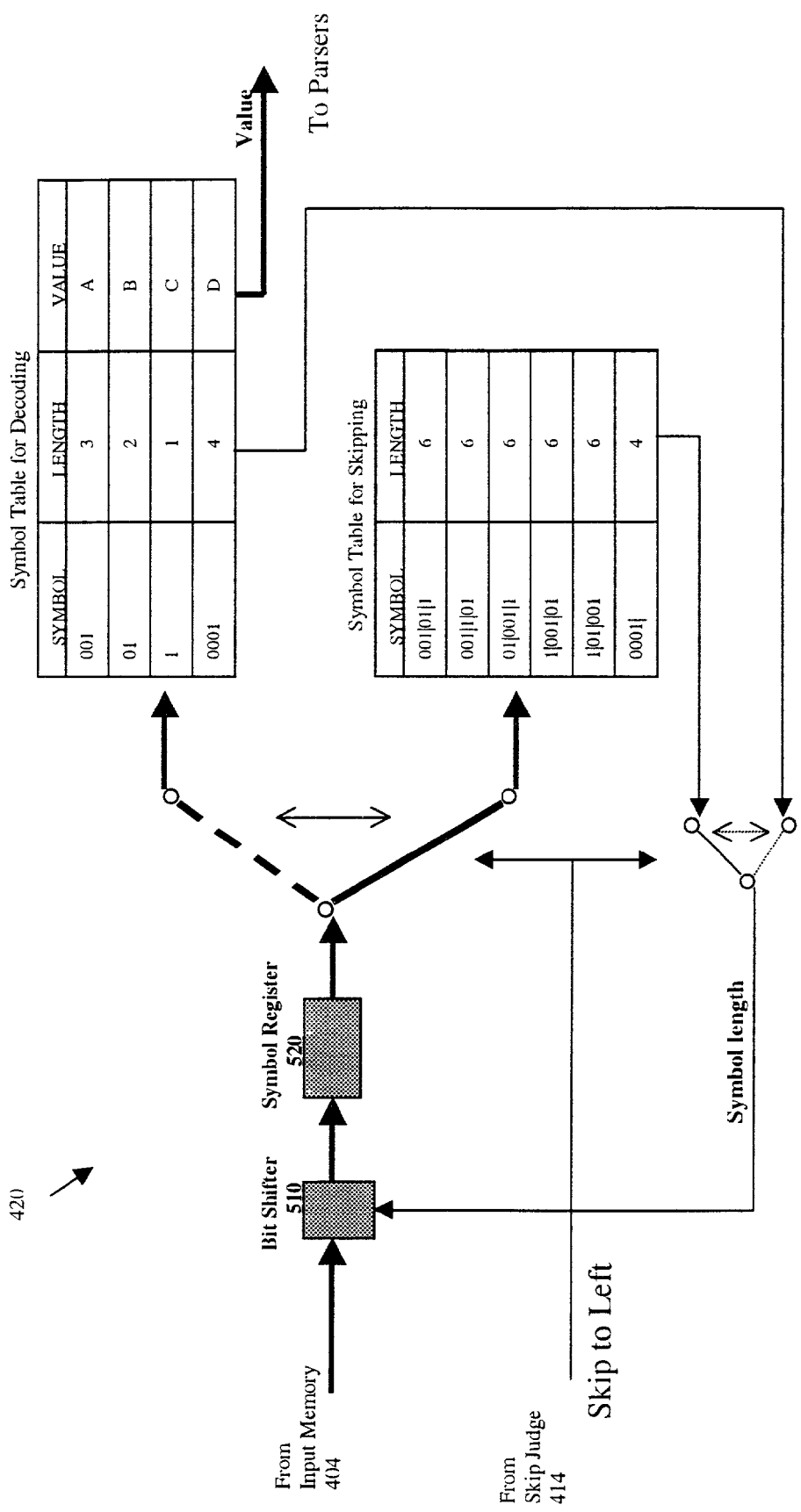
FIG. 5 shows the embodiment of the symbol decoder from FIG. 4.

FIG. 5 shows the embodiment of the symbol decoder 420 from FIG. 4. The symbol decoder 420 includes a bit shifter 510, a symbol register 520, and symbol tables. According to the instruction provided by the skip judge during the period for skipping the left portion of picture, the symbol table is switched to Symbol Table for Skipping. According to the instruction provided by the skip judge 414 during the period for decoding of the picture, the symbol table is switched to Symbol Table for Decoding.

The output from the Symbol Table for Decoding includes a length of each symbol and a value. The value is transferred to the picture layer syntax parser 430 and the MB layer parser 440 simultaneously as is mentioned earlier. The length is provided to the bit shifter 510 as a feedback to shift the incoming data for the next table look-up.

In one embodiment, the Symbol Table for Skipping includes a different symbol and length from Symbol Table for decoding. Here, some symbols which are distinctively registered in the Symbol Table for Decoding are combined together to one concatenated symbol for quick advancing of the stream for skipping. The length for the concatenated symbol has the sum of the length of the associated symbols. The length from the Symbol Table for decoding and the length from the Symbol Table for Skipping are switched synchronously with switching the tables. In skipping mode, some symbols, such as the motion vector, quantization code and intra DC values, are decoded because they may be used to predict these values in the future MBs.

Figure 6:
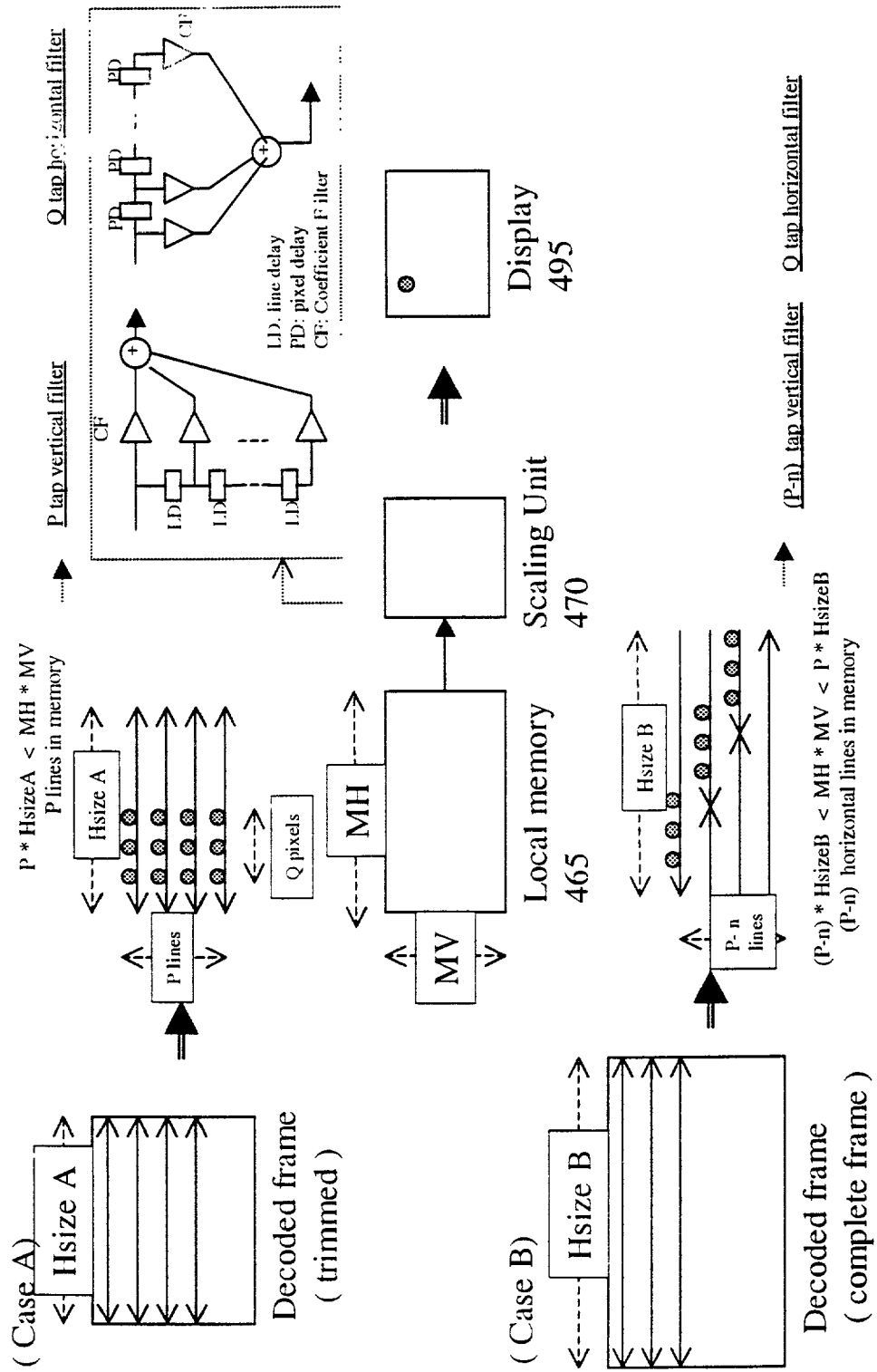
FIG. 6 shows the embodiment of the scaling unit of FIG. 4 in conjunction with the local memory of FIG. 4.

FIG. 6 shows the embodiment of the scaling unit 470 of FIG. 4 in conjunction with the local memory 465 of FIG. 4. In one embodiment, and as seen in FIG. 6, the scaling unit 470 includes a one-dimensional vertical linear filter and a one-dimensional horizontal linear filter, or a two-dimensional vertical-horizontal filter with a certain number of filtering coefficient sets. FIG. 6 shows an example of a P-tap vertical and a Q-tap horizontal filter configuration in which internal registers link together in the scaling unit 470. Line delay (LD) includes data in a different vertical line position but in the same horizontal location when the local memory 465 is read. Pixel delay (PD) includes data in the same vertical line but different horizontal location when the local memory 465 is read. Filter coefficient sets (CF) are allocated in registers in the scaling unit 470 to execute inner product operation for such P-tap vertical and Q-tap horizontal filtering. As a result, one unique pixel value is generated for display 495.

Local memory 465 contributes to improve the bandwidth between the processor and the external memory by storing data in multiple of lines. But only limited capacity is allowed in the local memory 465. On the other hand, picture quality is usually more sensitive in vertical filtering than in horizontal filtering because consumer display monitors display a picture in an interlaced format. Accordingly, storing small amounts of data in horizontal contributes to extending the number of lines in vertical in the local memory 465. This, in turn, leads to improved picture quality.

Case A in FIG. 6 is the output of both trimmed decoding and complete decoding plus reading partially in horizontal (Hsize A). Unlike Case B, which is the complete frame decoding output plus reading the whole picture with horizontal size of Hsize B, Case A thereby allows more number of lines to be stored in the local memory 465, as shown in the following equation:

$$P \times Hsize\ A < MH \times MV < P \times Hsize\ B,$$

where
P is the number of lines in memory,
MH is local memory size for horizontal,
MV is local memory size for vertical.

Figure 7:
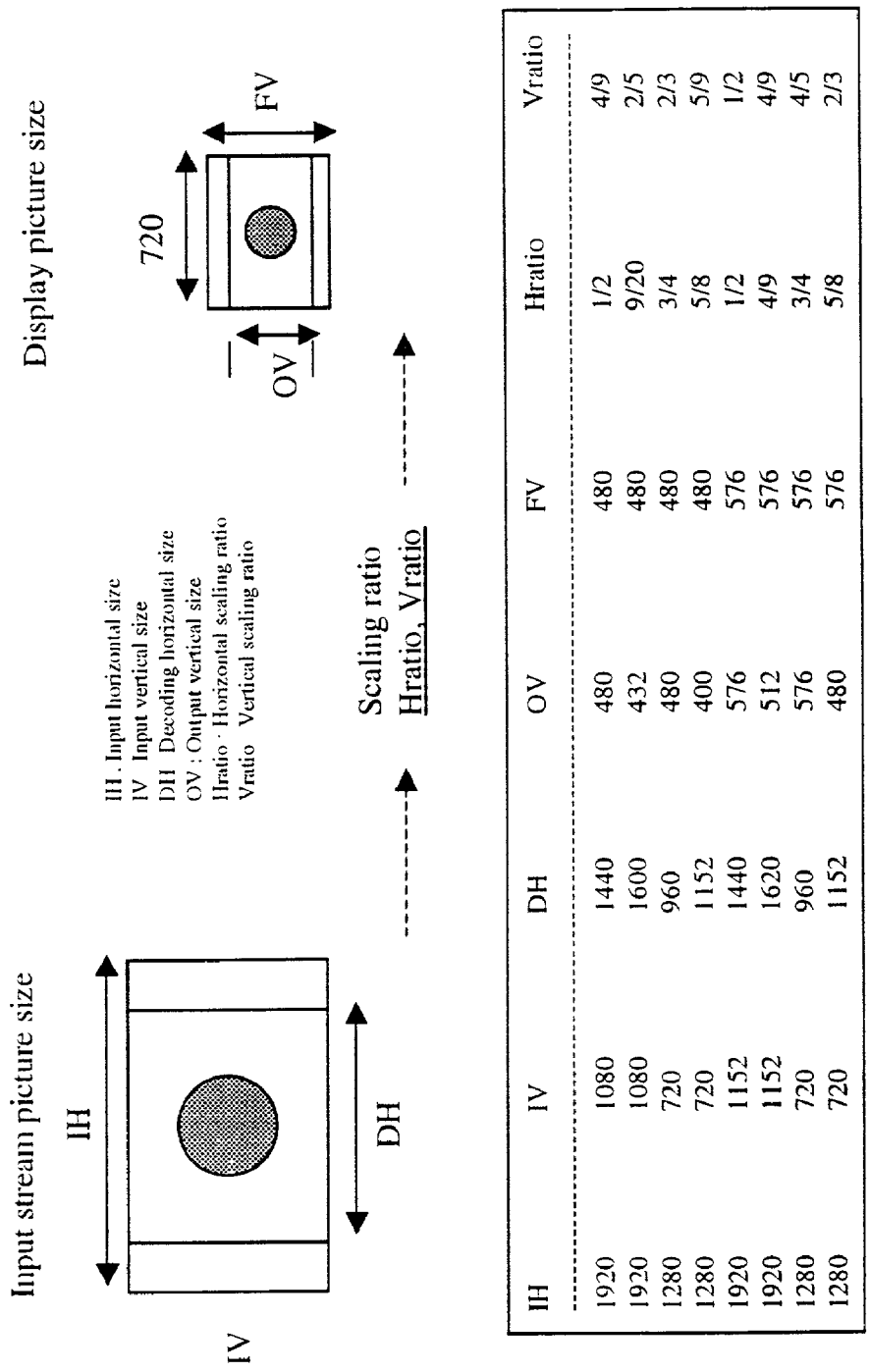
FIG. 7 shows scaling ratio combinations from different picture sizes to corresponding picture sizes.

FIG. 7 shows scaling ratio combinations from different picture sizes to corresponding display picture sizes. An input stream picture size includes an input horizontal size (IH), an input vertical size (IV), and a decoding horizontal size (DH). A scaling ratio both in horizontal, Hratio, and vertical, Vratio, determines a display picture size. The display picture size includes an output vertical size (OV) and a full vertical size (FV). Various scaling ratio combinations including values for the above-mentioned parameters are shown in a table in FIG. 7.

Figure 8:
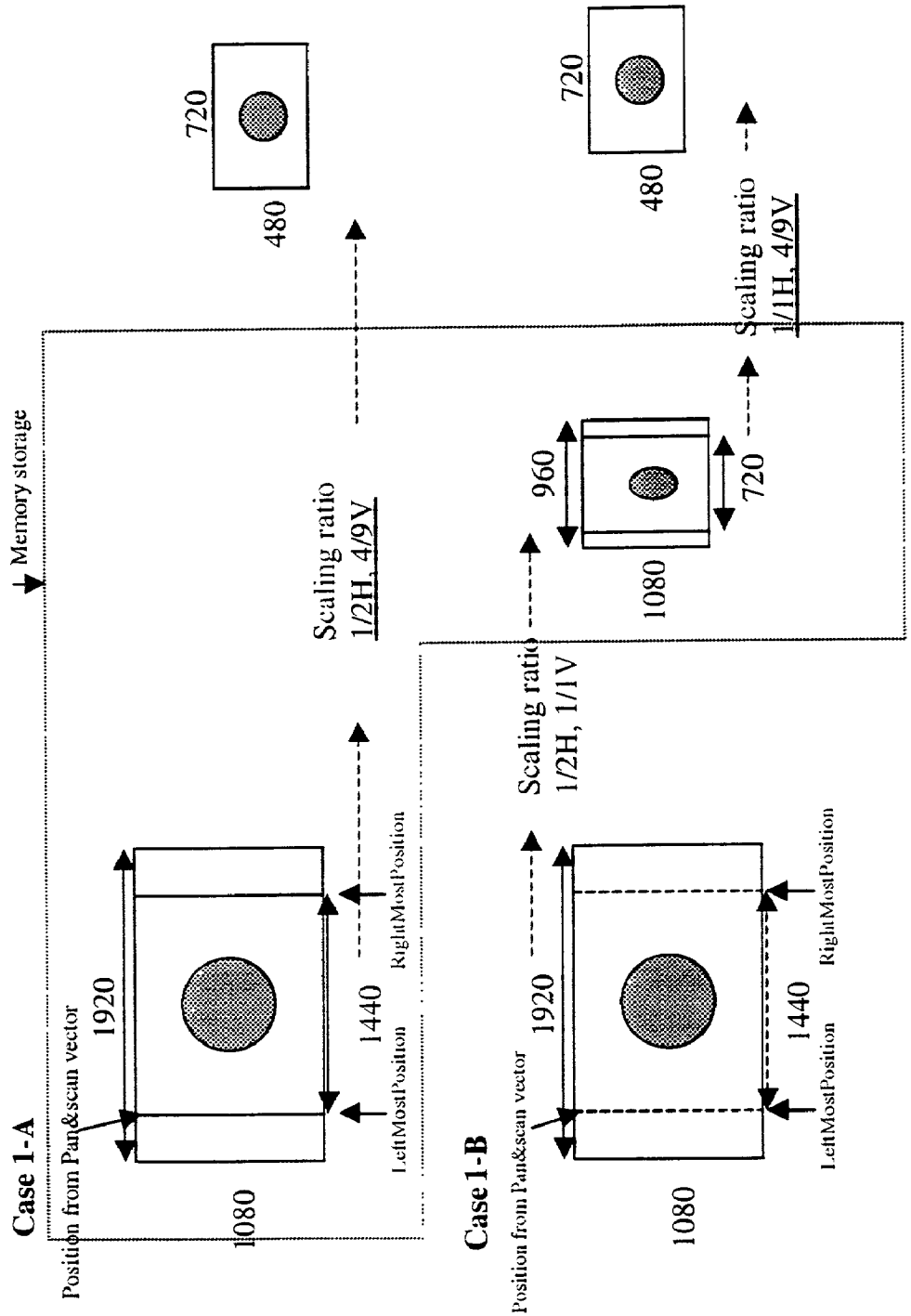
FIG. 8 shows memory storage for scaling with and without trimming during decoding.

FIG. 8 shows memory storage for scaling with and without trimming during decoding. In FIG. 8, Case 1-A shows memory storage for a video decoder that decodes a complete frame and stores that decoded frame in memory. When the scaling is applied to the decoded frames, the simplest scaling ratio for both vertical and horizontal direction is always desired. For example, in the case of conversion from 1080i to 480i while maintaining vertical full resolution, the scaling ratio is 9:4 in vertical. If the pixel aspect ratio is taken into account at the converted frame, 4/9×9/8 makes a 2:1 ratio in horizontal. This means that 1440 pixels (720×2), out of 1920 in horizontal, takes place in the scaling.

As discussed previously with regard to the previous figures, there is an option to apply the scaling within the video decoding process. In FIG. 8, Case 1-B shows memory storage for a video decoder that applies down decoding (down converting) in the horizontal direction and stores the decoded frame in the memory with horizontally in half resolution. This means that the horizontal size in the decoded frame is 960 pixels (1920/2). Here, the scaling after the video decoding is 9:4 in vertical and 720 pixels out of 960 in horizontal with no scaling in horizontal (but reading from the frame memory) in order to maintain the correct pixel aspect ratio in the scaled frame.

In both 1-A and 1-B cases, reading the pixel data is applied partially to the stored frame in memory resulting in a trimmed effect horizontally upon displaying the picture. Case 1-B saves frame memory size and also the local memory size for scaling while the display picture quality is comparative. If it makes use of the remained space in the local memory by filling the extra data for scaling, resulting picture quality after scaling can be improved.

If reading frame is applied partially, only the portion of the frame to be scaled can be stored. Video decoder handles this trimming during the decoding of picture. The trimming is applied by partially skipping the picture decoding.

Figure 9:
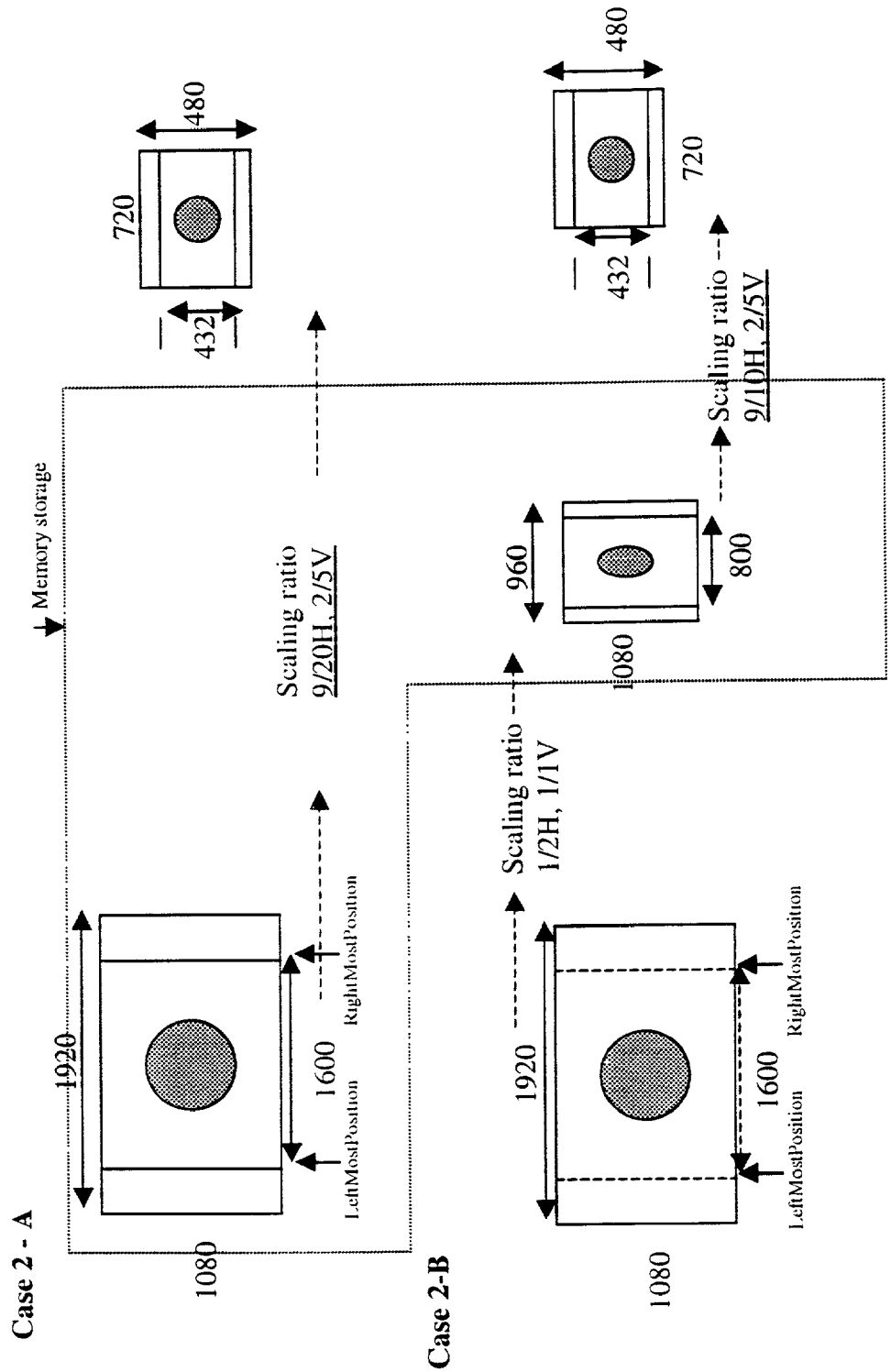
FIG. 9 shows memory storage for scaling with and without trimming during decoding for a wider aspect in horizontal.

FIG. 9 shows memory storage for scaling with and without trimming during decoding for a wider aspect in horizontal. In these cases, the system can include more local memory space for the scaling. FIG. 9 shows the scaling ratio in vertical and horizontal for a wider aspect in horizontal by reducing the horizontally trimmed portion.

The trimmed out portion in FIG. 9 is 320 pixels (1920–1600) in horizontal while the timed out portion in FIG. 8 is 480 pixels (1920–1440) in horizontal. The side effect of this approach occurs in vertical frame appearance. Since the cases in FIG. 9 apply vertical scaling to the decoded frame, the scaled frame size is 720 pixels in horizontal (which is a full scale) but only 432 (1080×2/5) vertical lines in a frame. The remaining lines are filled with border color, which looks like a so called letter-boxed format. However, wide spread consumer TV monitors generally underscan the active video area of 480 lines, so displaying 432 lines out of 480 lines could not be visible to the audience. Instead, the picture aspect gets wider than the trimmed frame format if the scaling local memory size is big enough to handle slightly long filter taps to do 20:9 (or 10:9) in horizontal and 5:2 in vertical.

Figure 10:
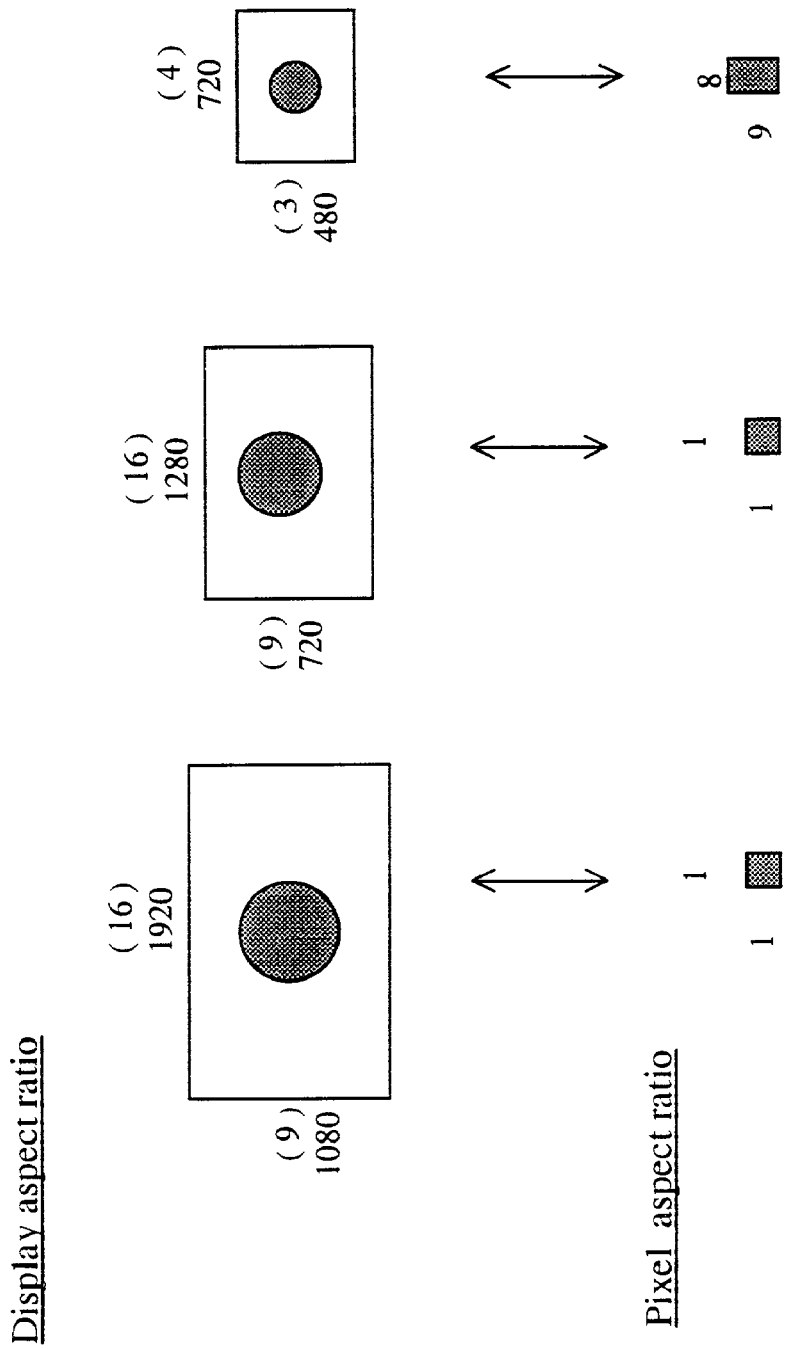
FIG. 10 shows several display aspect ratios for different video formats and corresponding pixel aspect ratios.

FIG. 10 shows several display aspect ratios for different video formats and corresponding pixel aspect ratios. As seen in FIG. 10, there are various different aspect ratio in different video formats. For example, a 1920×1080 video (1080i) with a 16:9 display aspect ratio has a pixel aspect ratio of 1:1. A 1280×720 video (720p) with a 16:9 display aspect ratio has a pixel aspect ratio of 1:1. For a 720×480 video (480i) with a 4:3 display aspect ratio, the pixel aspect ratio is 8:9. When the frame size conversion of 1080i to 480i with scaling takes place, the conversion should maintain the pixel aspect ratio by choosing the appropriate portion of the source frame for the scaling.

Figure 11:
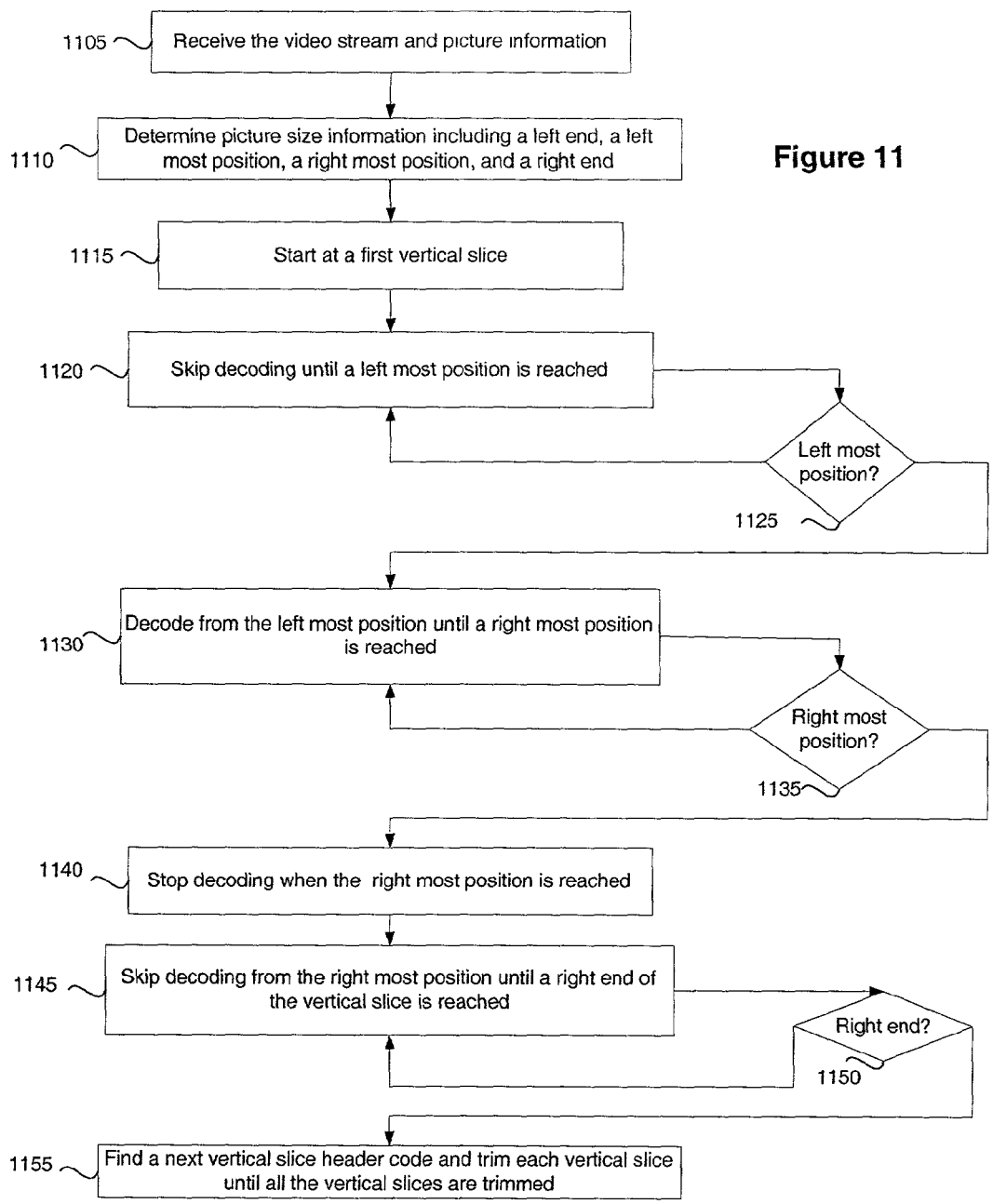
FIG. 11 shows a flow diagram for one embodiment of a process of trimming during decoding of a video stream.

FIG. 11 shows a flow diagram for one embodiment of a process 1100 of trimming during decoding of a video stream. At processing block 1105, the video stream and picture information are received. At processing block 1110, picture size information including a left end, a left most position, a right most position, and a right end are determined. At processing bocks 1115 and 1120, at a first vertical slice, decoding is skipped until a left most position is reached.

At processing block 1125, it is determined if a left most position has been reached. If no, the process 1100 moves back to processing block 1120 and decoding is skipped until the left most position is reached. If yes, the process 1100 moves to processing block 1125, and decoding occurs from the left most position until a right most position is reached.

At processing block 1135, it is determined if a right most position has been reached. If no, the process 1100 moves back to processing block 1130, and decoding is skipped until the right most position is reached. If yes, the process 1100 moves to processing block 1140. At processing blocks 1140 and 1145, when the right most position is reached, decoding is skipped from the right most position until a right end of the vertical slice is reached.

At processing block 1150, it is determined if the right end has been reached. If no, the process 1100 moves back to processing block 1145 and decoding is skipped until the right end is reached. If yes, the process 1100 moves to processing block 1155. At processing block 1155, a next vertical slice header code is found and each vertical slice is trimmed until all vertical slices have been trimmed.

It will be appreciated that that more or fewer processes may be incorporated into the method(s) illustrated in FIG. 11 without departing from the scope of the invention and that no particular order is implied by the arrangement of blocks shown and described herein. It further will be appreciated that the method(s) described in conjunction with FIG. 11 may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Furthermore, it is common in the art to speak of software, in one form or another (e.g., program, procedure, process, application, module, logic . . .), as taking an action or causing a result. Such expressions are merely a shorthand way of saying that execution of the software by a computer causes the processor of the computer to perform an action or a produce a result.

Figure 12:
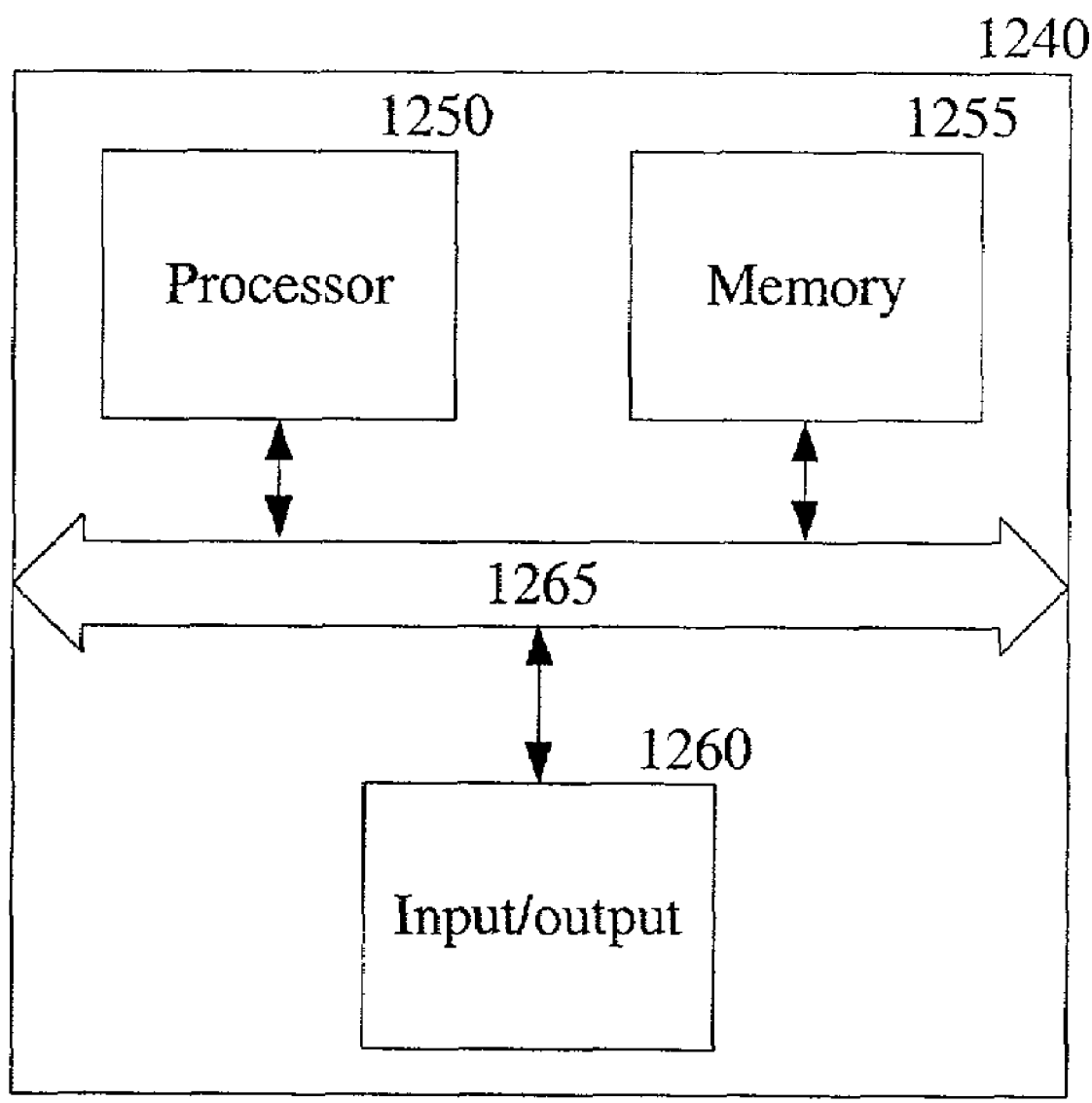
FIG. 12 shows a block diagram for one embodiment of a computer system.

One embodiment of a computer system suitable for use as video decoder is illustrated in FIG. 12. The computer system 1240, includes a processor 1250, memory 1255 and input/output capability 1260 coupled to a system bus 1265. The memory 1255 is configured to store instructions which, when executed by the processor 1250, perform the methods described herein. The memory 1255 may also store the input and currently edited video content. Input/output 1260 provides for the delivery and display of the video content or portions or representations thereof. Input/output 1260 also encompasses various types of computer-readable media, including any type of storage device that is accessible by the processor 1250. One of skill in the art will immediately recognize that the term "computer-readable medium/media" further encompasses a carrier wave that encodes a data signal. It will also be appreciated that the server 1201 is controlled by operating system software executing in memory 1255. Input/output and related media 1260 store the computer-executable instructions for the operating system and methods of the present invention as well as the video content.

The description of FIG. 12 is intended to provide an overview of computer hardware and other operating components suitable for implementing the invention, but is not intended to limit the applicable environments. It will be appreciated that the computer system 1240 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

There are several advantages of the present invention. Some of these advantages include: (1) picture display quality through the scaling to different pixel aspect ratio is improved through the reduction of horizontal picture size; (2) cost effectiveness is increased by yielding relatively slow processor speed; (3) cost effectiveness is increased by reducing the size of on-chip local memory for scaling; and (4) cost effectiveness is increased by requiring needing less amount of frame memory.

Figure 13:
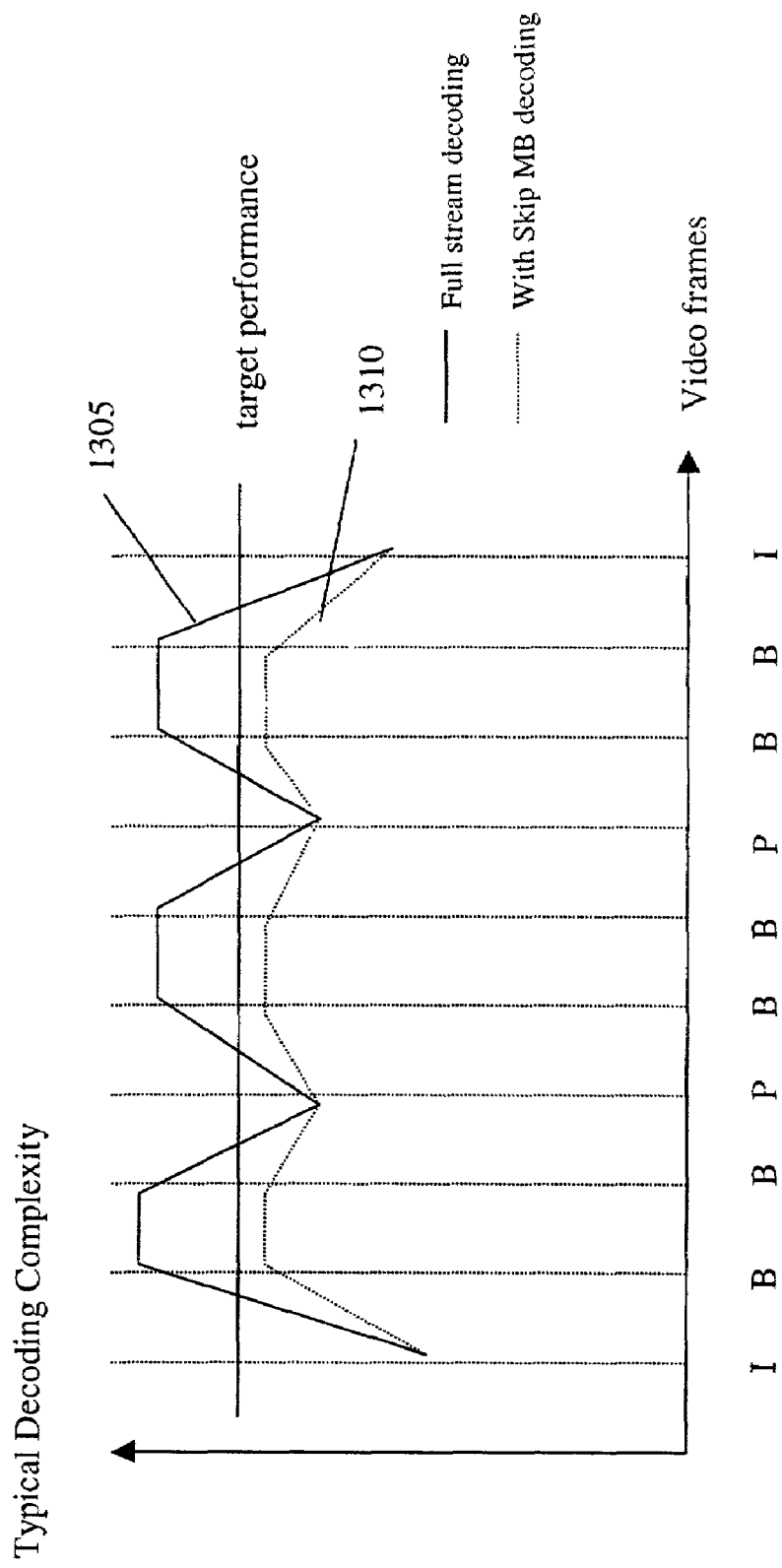
FIG. 13 shows a graph illustrating the difference in complexity between normal decoding and trimming during decoding.

FIG. 13 shows a graph illustrating the difference in complexity between normal decoding (full stream decoding) 1305 and trimming during decoding (with Skip MB decoding) 1310. Particularly, trimming during decoding can yield the typical case performance by skipping the number of macro block data on B picture. This includes the most complicated prediction, thereby resulting in the most time consuming performance to apply with a software decoder. Accordingly, not even an excellent performance processor may be utilized for real time decoding by using this technology, and this results in reducing the cost of the system.

A video decoder and a method for using the same have been described. Although the present invention has been described with reference to specific embodiments, the specification and drawings are to be regarded as illustrative rather than restrictive.

What is claimed is:

1. A method of trimming selected frames of a Motion Pictures Expert Group (MPEG) video stream during decoding comprising:
   receiving the video stream including I, P, and B frames, wherein the I, P, and B frames are compressed according to the MPEG standard;
   decoding only predetermined portions of each B frame of the video stream, the predetermined portions determined by display resolution; and
   scaling portions of the I and P frames retrieved from decoded I and P frames, wherein the size of the retrieved I and P frame portions are based on the only predetermined portions of each B frame, the scaling comprises vertical filtering.

2. The method of claim 1 wherein the predetermined portions comprises portions to be displayed.

3. The method of claim 1 further comprising:
   storing the decoded portions of B frame data; and
   fully decoding an I frame and a P frame of the video stream.

4. The method of claim 1 wherein decoding only predetermined portions of each B frame of the video stream comprises decoding the predetermined portions of each B frame by vertical slice.

5. The method of claim 4 wherein decoding the predetermined portions of each B frame by vertical slice comprises:
   determining picture size information including a left end, a left most position, a right most position, and a right end; and
   decoding predetermined portions of each vertical slice, wherein decoding predetermined portions of each vertical slice comprises:
      skipping a first portion between the left end and the left most position for the vertical slice; and
      decoding a second portion between the left most position and the right most position for the vertical slice; and
   skipping a third portion between the right most position and the right end.

6. The method of claim 5 wherein the picture size information is selected from the group consisting of inverse discrete cosine transform (IDCT) coefficients, motion vector information, macro block header information, or current macro block position information.

7. The method of claim 6 further comprising:
   performing an inverse discrete cosine transform (IDCT) on the decoded portions of the B frame; and
   adding an output of the IDCT with data in a spatially shifted location in an anchor frame as instructed by the motion vector information.

8. The method of claim 1 wherein the video stream is a MPEG2 video stream.

9. A method of trimming a B frame of a Motion Pictures Expert Group (MPEG) video stream during decoding comprising:
   receiving the video stream and picture information;
   resetting a macro block counter; and
   decoding the predetermined portions of the B frame by vertical slice, the predetermined portions determined by display resolution, wherein the B frame is compressed according to the MPEG standard and decoding the predetermined portions of each vertical slice comprises:
finding a vertical slice header code;
starting at a left end of the vertical slice;
skipping decoding until a macro block counter value is equivalent to a left most position of the vertical slice;
decoding when the macro block counter value exceeds the left most position and until the macro block counter value reaches a right most position of the vertical slice;
stopping decoding when the macro block counter value reaches a right most position of the vertical slice; and
skipping decoding when the macro block counter value exceeds the right most position and until the macro block counter value reaches a right end of the vertical slice.

10. A machine-readable medium having executable instructions to cause a computer to perform a method comprising:
receiving the video stream including I, P, and B frames, wherein the I, P, and B frames are compressed according to a Motion Pictures Expert Group (MPEG) standard;
decoding only predetermined portions of each B frame of the video stream, the predetermined portions determined by display resolution; and
scaling portions of the I and P frames retrieved from decoded I and P frames, wherein the size of the retrieved I and P frame portions are based on the only predetermined portions of each B frame, the scaling comprises vertical filtering.

11. The machine-readable medium of claim 10 wherein the predetermined portions comprises portions to be displayed.

12. The machine-readable medium of claim 10 further comprising:
storing the decoded portions of B frame data; and
fully decoding an I frame and a P frame of the video stream.

13. The machine-readable medium of claim 10 wherein decoding only predetermined portions of each B frame of the video stream comprises decoding the predetermined portions of each B frame by vertical slice.

14. The machine-readable medium of claim 13 wherein decoding the predetermined portions of each B frame by vertical slice comprises:
determining picture size information including a left end, a left most position, a right most position, and a right end; and
decoding predetermined portions of each vertical slice, wherein decoding predetermined portions of each vertical slice comprises:
skipping a first portion between the left end and the left most position for the vertical slice; and
decoding a second portion between the left most position and the right most position for the vertical slice; and
skipping a third portion between the right most position and the right end.

15. A machine-readable medium having executable instructions to cause a computer to perform a method comprising:
receiving the video stream and picture information;
resetting a macro block counter; and
decoding predetermined portions of the B frame by vertical slice, the predetermined portions determined by display resolution, wherein the B frame is compressed according to the MPEG standard and decoding the predetermined portions of each vertical slice comprises:
finding a vertical slice header code;
starting at a left end of the vertical slice;
skipping decoding until a macro block counter value is equivalent to a left most position of the vertical slice;
decoding when the macro block counter value exceeds the left most position and until the macro block counter value reaches a right most position of the vertical slice;
stopping decoding when the macro block counter value reaches a right most position of the vertical slice; and
skipping decoding when the macro block counter value exceeds the right most position and until the macro block counter value reaches a right end of the vertical slice.

16. A video decoder comprising:
a variable length decoding unit to receive a video stream and decode symbols in the video stream, the variable length decoding unit including a skip judge to instruct units within the video decoder to skip decoding, and wherein only predetermined portions of a B frame of the video stream are decoded and the B frame is compressed according to the MPEG standard, the predetermined portions determined by display resolution;
a scaling unit to scale portions of I and P frames retrieved from decoded I and P frames, wherein the size of the retrieved I and P frame portions are based on the only predetermined portions of each B frame, the scaling comprises vertical filtering; and
a picture layer decoding unit to receive at least one of information from the variable length decoding unit and information from a system controller.

17. The video decoder of claim 16 further comprising a macro block counter in the variable length decoding unit to count macro blocks in each vertical slice of the B frame.

18. The video decoder of claim 17 wherein the skip judge gives instructions to skip decoding by macro block.

19. The video decoder of claim 16 wherein the scaling unit further performs horizontal filtering to generate a target frame size according to a scaling ratio provided by the picture layer decoding unit.

20. The video decoder of claim 16 further comprising a formatter to configure decoded data in a predetermined format.

21. The video decoder of claim 16 further comprising a reconstruction unit to receive information from the variable length and picture layer decoding unit, perform an inverse discrete cosine transform (IDCT) on the decoded portions of the B frame, and add an output of the IDCT with data in a spatially shifted location in an anchor frame as instructed by motion vector information.

22. The video decoder of claim 16 wherein the variable length decoding unit comprises:
a symbol decoder to receive the video stream and decode symbols in the video stream;
a picture layer syntax parser to determine information in the video stream higher than a macro block layer, the picture layer syntax parser passing the information to the picture layer decoding unit; and
a macro block syntax parser to determined information at the macro block layer and below the macro block layer.

23. The video decoder of claim 16 wherein the predetermined portions of the B frame to be decoded include portions between a left most end and a right most end on each of a plurality of vertical slice layers of the B frame.

24. The video decoder of claim 16 wherein the video stream is an MPEG2 video stream.

25. A system to decode, convert, and format a video stream for display comprising:
   a demultiplexer to receive and extract information in a layer of the video stream, the video stream including I, P, and B frames;
   a video decoder to decode a video stream received from the demultiplexor, the video decoder decoding only predetermined portions of each B frame of the video stream and the B frame is compressed according to the MPEG standard, the predetermined portions determined by display resolution;
   a scaling unit to scale portions of I and P frames retrieved from decoded I and P frames, wherein the size of the retrieved I and P frame portions are based on the only predetermined portions of each B frame, the scaling comprises vertical filtering; and
   a digital to analog converter to convert a decoded video signal from the video decoder to an analog signal to be displayed on a display device.

26. The system of claim 25 wherein the video decoder comprises:
   a variable length decoding unit to receive a video stream and decode symbols in the stream, the variable length decoding unit including a skip judge to instruct units within the video decoder to skip decoding, and wherein only predetermined portions of a B frame of the video stream are decoded; and
   a picture layer decoding unit to receive at least one of information from the variable length decoding unit and information from a system controller.

27. The system of claim 26 wherein the video decoder further comprises a macro block counter in the variable length decoding unit to count macro blocks in each vertical slice of the B frame.

28. The system of claim 27 wherein the skip judge gives instructions to skip decoding by macro block.

29. The system of claim 26 wherein the scaling unit further performs horizontal filtering to generate a target frame size according to a scaling ratio provided by the picture layer decoding unit.

30. The system of claim 26 wherein the video decoder further comprises a formatter to configure decoded data in a predetermined format.

31. The system of claim 26 wherein the video decoder further comprises a reconstruction unit to receive information from the variable length and picture layer decoding unit, perform an inverse discrete cosine transform (IDCT) on the decoded portions of the B frame, and add an output of the IDCT with data in a spatially shifted location in an anchor frame as instructed by motion vector information.

32. The system of claim 26 wherein the variable length decoding unit comprises:
   a symbol decoder to receive the video stream and decode symbols in the video stream;
   a picture layer syntax parser to determine information in the video stream higher than a macro block layer, the picture layer syntax parser passing the information to the picture layer decoding unit; and
   a macro block syntax parser to determined information at the macro block layer and below the macro block layer.

33. The system of claim 25 wherein the predetermined portions of the B frame to be decoded include portions between a left most end and a right most end on each of a plurality of vertical slice layers of the B frame.

34. The system of claim 25 the video stream is an MPEG2 video stream.

* * * * *